(12) United States Patent
Chen et al.

(10) Patent No.: US 10,866,879 B2
(45) Date of Patent: *Dec. 15, 2020

(54) SYSTEM AND METHOD FOR GRAPH BASED MONITORING AND MANAGEMENT OF DISTRIBUTED SYSTEMS

(71) Applicant: Cisco Technology, Inc., San Jose, CA (US)

(72) Inventors: Mingye Chen, New York, NY (US); Xinyuan Huang, San Jose, CA (US); Debojyoti Dutta, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,106

(22) Filed: Jun. 6, 2019

(65) Prior Publication Data

US 2019/0286548 A1 Sep. 19, 2019

Related U.S. Application Data

(63) Continuation of application No. 15/786,790, filed on Oct. 18, 2017, now Pat. No. 10,353,800.

(51) Int. Cl.
*G06F 9/44* (2018.01)
*G06F 11/36* (2006.01)
(Continued)

(52) U.S. Cl.
CPC ........ *G06F 11/3612* (2013.01); *G06F 11/302* (2013.01); *G06F 11/3048* (2013.01);
(Continued)

(58) Field of Classification Search
CPC ............... G06F 11/0751; G06F 11/302; G06F 11/3048; G06F 11/3051; G06F 11/3409;
(Continued)

(56) References Cited

U.S. PATENT DOCUMENTS 6,108,782 A 8/2000 Fletcher et al.
6,343,290 B1 1/2002 Cossins et al.
(Continued)

FOREIGN PATENT DOCUMENTS

CN 101394360 7/2011
CN 102164091 8/2011
(Continued)

OTHER PUBLICATIONS

Shawn A. Bohner, "Extending Software Change Impact Analysis into COTS Components", 2003, IEEE, 8 pages (Year: 2003).
(Continued)

*Primary Examiner* — Ted T. Vo
(74) *Attorney, Agent, or Firm* — Polsinelli PC

(57) ABSTRACT

A controller can receive first and second metrics respectively indicating distributed computing system servers' CPU, memory, or disk utilization, throughput, or latency for a first time. The controller can receive third and fourth metrics for a second time. The controller can determine a first graph including vertices corresponding to the servers and edges indicating data flow between the servers, a second graph including edges indicating the first metrics satisfy a first threshold, a third graph including edges indicating the second metrics satisfy a second threshold, a fourth graph including edges indicating the third metrics fail to satisfy the first threshold, and a fifth graph including edges indicating the fourth metrics fail to satisfy the second threshold. The controller can display a sixth graph indicating at least one of first changes between the second graph and the fourth graph or second changes between the third graph and the fifth graph.

20 Claims, 11 Drawing Sheets

(51) Int. Cl.
*G06F 11/30* (2006.01)
*G06F 11/34* (2006.01)
*G06F 11/07* (2006.01)
*H04L 12/26* (2006.01)

(52) U.S. Cl.
CPC ...... *G06F 11/3051* (2013.01); *G06F 11/3409* (2013.01); *G06F 11/3495* (2013.01); *G06F 11/0751* (2013.01); *H04L 43/00* (2013.01)

(58) Field of Classification Search
CPC ... G06F 11/3495; G06F 11/3612; H04L 43/00
USPC .................................. 717/101–105, 131–133
See application file for complete search history.

(56) References Cited

U.S. PATENT DOCUMENTS

| | | |
|---|---|---|
| 6,721,804 B1 | 4/2004 | Rubin et al. |
| 6,733,449 B1 | 5/2004 | Krishnamurthy et al. |
| 7,076,397 B2 | 7/2006 | Ding et al. |
| 7,277,948 B2 | 10/2007 | Igarashi et al. |
| 7,480,672 B2 | 1/2009 | Hahn et al. |
| 7,496,043 B1 | 2/2009 | Leong et al. |
| 7,917,647 B2 | 3/2011 | Cooper et al. |
| 8,028,071 B1 | 9/2011 | Mahalingam et al. |
| 8,041,714 B2 | 10/2011 | Aymeloglu et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,301,746 B2 | 10/2012 | Head et al. |
| 8,345,692 B2 | 1/2013 | Smith |
| 8,406,141 B1 | 3/2013 | Couturier et al. |
| 8,477,610 B2 | 7/2013 | Zuo et al. |
| 8,495,356 B2 | 7/2013 | Ashok et al. |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,663 B2 | 10/2013 | Baucke et al. |
| 8,590,050 B2 | 11/2013 | Nagpal et al. |
| 8,630,291 B2 | 1/2014 | Shaffer et al. |
| 8,639,787 B2 | 1/2014 | Lagergren et al. |
| 8,660,129 B1 | 2/2014 | Brendel et al. |
| 8,719,804 B2 | 5/2014 | Jain |
| 8,775,576 B2 | 7/2014 | Hebert et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,164,795 B1 | 10/2015 | Vincent |
| 9,167,050 B2 | 10/2015 | Durazzo et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,632,858 B2 | 4/2017 | Sasturkar et al. |
| 9,658,876 B2 | 5/2017 | Chang et al. |
| 9,684,524 B1* | 6/2017 | Porter ................. G06F 11/3452 |
| 9,692,802 B2 | 6/2017 | Bicket et al. |
| 9,755,858 B2 | 9/2017 | Bagepalli et al. |
| 10,353,800 B2* | 7/2019 | Chen ..................... H04L 41/12 |
| 2002/0073337 A1 | 6/2002 | Ioele et al. |
| 2002/0143928 A1 | 10/2002 | Maltz et al. |
| 2002/0174216 A1 | 11/2002 | Shorey et al. |
| 2003/0018591 A1 | 1/2003 | Komisky |
| 2003/0228585 A1 | 12/2003 | Inoko et al. |
| 2006/0126665 A1 | 6/2006 | Ward et al. |
| 2008/0201711 A1 | 8/2008 | Amir Husain |
| 2008/0235755 A1 | 9/2008 | Blaisdell et al. |
| 2009/0019367 A1 | 1/2009 | Cavagnari et al. |
| 2009/0138763 A1 | 5/2009 | Arnold |
| 2009/0177775 A1 | 7/2009 | Radia et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0191783 A1 | 7/2010 | Mason et al. |
| 2010/0205601 A1 | 8/2010 | Abbas et al. |
| 2010/0211782 A1 | 8/2010 | Auradkar et al. |
| 2010/0318609 A1 | 12/2010 | Lahiri et al. |
| 2010/0325199 A1 | 12/2010 | Park et al. |
| 2010/0333116 A1 | 12/2010 | Prahlad et al. |
| 2011/0035754 A1 | 2/2011 | Srinivasan |
| 2011/0072489 A1 | 3/2011 | Parann-Nissany |
| 2011/0075667 A1 | 3/2011 | Li et al. |
| 2011/0126099 A1 | 5/2011 | Anderson et al. |
| 2011/0173303 A1 | 7/2011 | Rider |
| 2011/0219434 A1 | 9/2011 | Betz et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261828 A1 | 10/2011 | Smith |
| 2011/0276675 A1 | 11/2011 | Singh et al. |
| 2011/0276951 A1 | 11/2011 | Jain |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0214506 A1 | 8/2012 | Skaaksrud et al. |
| 2012/0222106 A1 | 8/2012 | Kuehl |
| 2012/0240113 A1 | 9/2012 | Hur |
| 2012/0265976 A1 | 10/2012 | Spiers et al. |
| 2012/0281706 A1 | 11/2012 | Agarwal et al. |
| 2012/0290647 A1 | 11/2012 | Ellison et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0091557 A1 | 4/2013 | Gurrapu |

(56) References Cited

U.S. PATENT DOCUMENTS

| | | |
|---|---|---|
| 2013/0097601 A1 | 4/2013 | Podvratnik et al. |
| 2013/0111540 A1 | 5/2013 | Sabin |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159496 A1 | 6/2013 | Hamilton et al. |
| 2013/0160008 A1 | 6/2013 | Cawlfield et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0075357 A1 | 3/2014 | Flores et al. |
| 2014/0075501 A1 | 3/2014 | Srinivasan et al. |
| 2014/0108985 A1 | 4/2014 | Scott et al. |
| 2014/0156557 A1 | 6/2014 | Zeng et al. |
| 2014/0164486 A1 | 6/2014 | Ravichandran et al. |
| 2014/0189095 A1 | 7/2014 | Lindberg et al. |
| 2014/0189125 A1 | 7/2014 | Amies et al. |
| 2014/0222953 A1 | 8/2014 | Karve et al. |
| 2014/0282536 A1 | 9/2014 | Dave et al. |
| 2014/0282889 A1 | 9/2014 | Ishaya et al. |
| 2014/0297569 A1 | 10/2014 | Clark et al. |
| 2014/0317261 A1 | 10/2014 | Shatzkamer et al. |
| 2014/0366155 A1 | 12/2014 | Chang et al. |
| 2015/0006470 A1 | 1/2015 | Mohan |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0089478 A1 | 3/2015 | Cheluvaraju et al. |
| 2015/0106802 A1 | 4/2015 | Ivanov et al. |
| 2015/0106805 A1 | 4/2015 | Melander et al. |
| 2015/0120914 A1 | 4/2015 | Wada et al. |
| 2015/0227405 A1 | 8/2015 | Jan et al. |
| 2015/0242204 A1 | 8/2015 | Hassine et al. |
| 2015/0281067 A1 | 10/2015 | Wu |
| 2015/0281113 A1 | 10/2015 | Siciliano et al. |
| 2015/0319063 A1 | 11/2015 | Zourzouvillys et al. |
| 2015/0326524 A1 | 11/2015 | Tankala et al. |
| 2015/0373108 A1 | 12/2015 | Fleming et al. |
| 2016/0062786 A1 | 3/2016 | Meng et al. |
| 2016/0099847 A1 | 4/2016 | Melander et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0188527 A1 | 6/2016 | Cherian et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0264663 A1 | 9/2017 | Bicket et al. |
| 2017/0310556 A1 | 10/2017 | Knowles et al. |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102918499 | 2/2013 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| WO | W0 2009/155574 | 12/2009 |
| WO | WO 2010/030915 | 3/2010 |
| WO | WO 2013/158707 | 10/2013 |

OTHER PUBLICATIONS

Hood et al., "Automated Proactive Anomaly Detection", 1997, Springer Science and Business Media Dordrecht , pp. 688-699 (Year:1997).

Author Unknown, "5 Benefits of a Storage Gateway in the Cloud," Blog, TwinStrata, Inc., Jul. 25, 2012, XP055141645, 4 pages, https://web.archive.org/web/20120725092619//http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.

Fang K., "LISP MAC-EID-TO-RLOC Mapping (LISP based L2VPN)," Network Working Group, Internet Draft, Cisco Systems, Jan. 2012, 12 pages.

Herry, William, "Keep It Simple, Stupid: OpenStack nova-scheduler and its algorithm", May 12, 2012, IBM, 12 pages.

(56) References Cited

OTHER PUBLICATIONS

Hewlett-Packard Company, "Virtual context management on network devices", Research Disclosure, vol. 564, No. 60, Apr. 1, 2011, Mason Publications, Hampshire, GB, Apr. 1, 2011, 524.

Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

Kolyshkin, Kirill, "Virtualization in Linux," Sep. 1, 2006, XP055141648, 5 pages, https://web.archive.org/web/20070120205111/http://download.openvz.org/doc/openvz-intro.pdf.

Lerach, S.R.O., "Golem," http://www.lerach.cz/en/products/golem, accessed Jul. 22, 2015, 2 pages.

Linthicum, David, "VM Import could be a game changer for hybrid clouds", InfoWorld, Dec. 23, 2010, 4 pages.

Naik, Vijay K., et al., "Harmony: A Desktop Grid for Delivering Enterprise Computations," Grid Computing, 2003, Fourth International Workshop on Proceedings, Nov. 17, 2003, pp. 1-11.

Nair, Srijith K. et al., "Towards Secure Cloud Bursting, Brokerage and Aggregation," 2012, 8 pages, www.flexiant.com.

Nielsen, "SimMetry Audience Measurement—Technology," http://www.nielsen-admosphere.eu/products-and-services/simmetry-audience-measurement-technology/, accessed Jul. 22, 2015, 6 pages.

Nielsen, "Television," http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

* cited by examiner

SYSTEM AND METHOD FOR GRAPH BASED MONITORING AND MANAGEMENT OF DISTRIBUTED SYSTEMS

CROSS REFERENCE TO RELATED APPLICATIONS

This application is a continuation of U.S. application Ser. No. 15/786,790, filed on Oct. 18, 2017, the contents of which are incorporated herein by reference in its entirety.

TECHNICAL FIELD

The present technology pertains to graph-based monitoring and management of network components of a distributed streaming system.

BACKGROUND

Distributed streaming systems play an increasingly important role in modern software-based services. Performance optimization of such streaming systems is very different from traditional cloud based services, due to the real-time and distributed nature of such systems, as well as the complex dependencies among different system components. On the other hand, developers of such applications may not have sufficient knowledge of tuning and optimizing their performance metrics.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
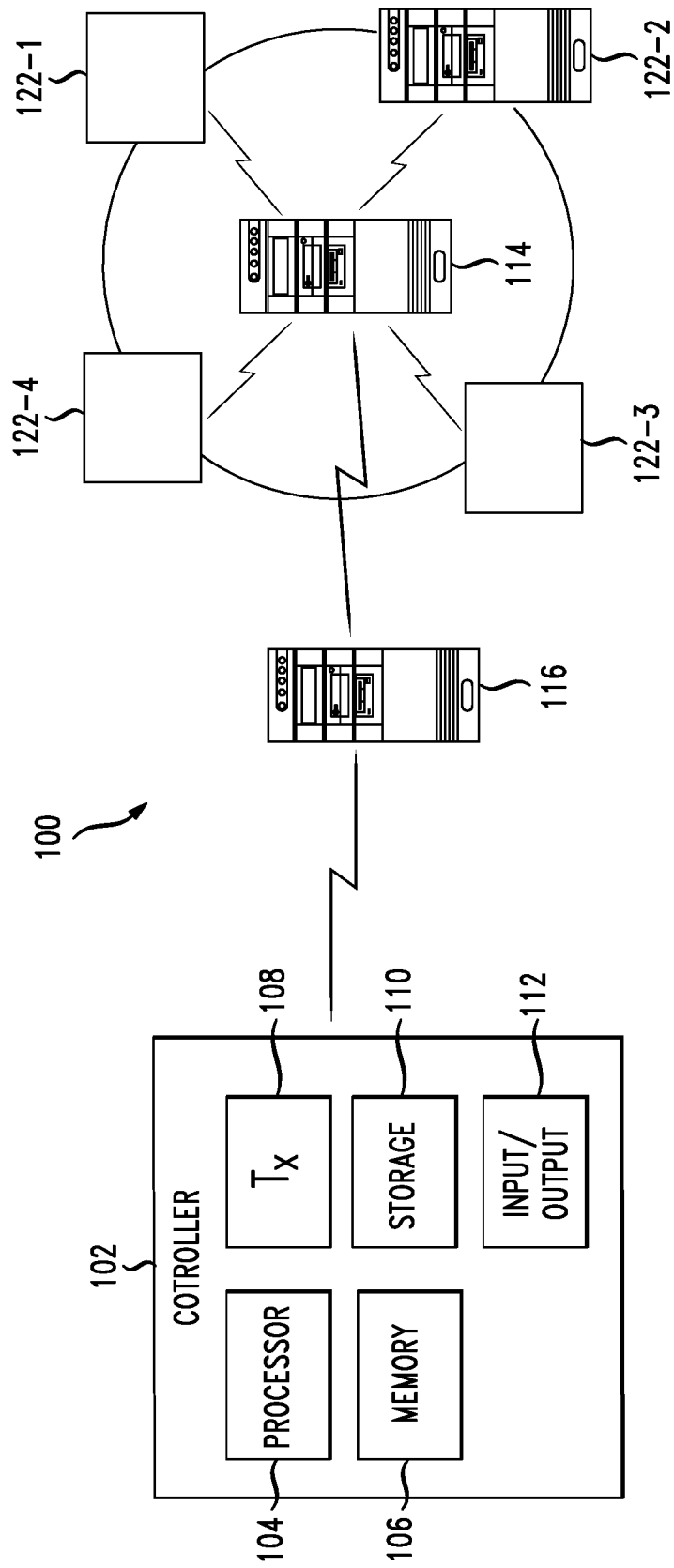
FIGS. 1A-D illustrate example network environments and architectures, according to one aspect of the present disclosure.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an example embodiment in the present disclosure can be, but not necessarily are, references to the same example embodiment; and, such references mean at least one of the example embodiments.

Reference to "one example embodiment" or "an example embodiment" means that a particular feature, structure, or characteristic described in connection with the example embodiment is included in at least one example of the disclosure. The appearances of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various features are described which may be features for some example embodiments but not other example embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In one aspect of the present disclosure, a method includes generating, by a processor, a first metrics and a second metrics based on data collected on a system; generating, by the processor, a topology graph representing data flow within the system; generating, by the processor, at least one first metrics graph corresponding to the first metrics based in part on the topology graph; generating, by the processor, at least one second metrics graph corresponding to the second metrics based in part on the topology graph; identifying, by the processor, a malfunction within the system based on a change in at least one of the first metrics graph and the second metrics graph; and sending, by the processor, a feedback on the malfunction to an operational management component of the system.

In one aspect of the present disclosure, a system includes a memory having computer-readable instructions stored therein; and one or more processors. The one or more processors are configured to execute the computer-readable instructions to perform the functions of generating a system metrics and a performance metrics based on data collected on a system; generating a topology graph representing data flow within the system; generating at least one system metrics graph corresponding to the system metrics based in part on the topology graph; generating at least one performance metrics graph corresponding to the performance metrics based in part on the topology graph; identifying a malfunction within the system based on a change in at least one of the system metrics graph and the performance metrics graph; and sending a feedback on the malfunction to an operational management component of the system.

In one aspect of the present disclosure, non-transitory computer-readable medium having computer-readable instructions, which when executed by one or more processors, cause the one or more processors to perform the functions of generating a system metrics and a performance metrics based on data collected on a system; generating a topology graph representing data flow within the system; generating at least one system metrics graph corresponding to the system metrics based in part on the topology graph; generating at least one performance metrics graph corresponding to the performance metrics based in part on the topology graph; identifying a malfunction within the system based on a change in at least one of the system metrics graph and the performance metrics graph; and sending a feedback on the malfunction to an operational management component of the system.

Description

The disclosed technology addresses the need in the art for a monitoring and management of network components of a distributed streaming system that application developers and operators can use to identify system performance deficiencies (e.g., system bottlenecks) and apply appropriate remedial actions to address such performance deficiencies. The distributed streaming system is a distributed network of function execution environments that can be serverless.

The disclosure begins with a description of example network environments and architectures which can be implemented for distributed streaming systems, as illustrated in FIGS. 1A-D.

FIG. 1A illustrates an example system, according to one aspect of the present disclosure. System 100 of FIG. 1A includes a controller 102 and a distributed streaming system 120. Controller 102 can be an application, a software container, a virtual machine, a service chain, a virtual function(s), etc. Controller 102 can run on one or more devices or servers having components such as one or more processors (e.g., processor 104), one or more memories (e.g., memory 106), a transceiver 108, a display device 110 and an input device 112. Processor 104 can be configured to execute computer-readable instructions stored on memory 106 for performing the functionalities which will be described below with reference to FIGS. 4-6. Throughout the disclosure, controller 102 can be referred to as system management component 102, management device 102, device 102 and/or system controller 102.

Transceiver 108 can be any known or to be developed receiver and transmitter through which controller 102 can send and receive information to and from external components such as components of distributed streaming system 120.

Network operators and controllers (operational management component) can use display 110 to view data corresponding to status and/or management of operation of distributed streaming system 120, as will be described below. Display 110 can be any type of know or to be developed display such as a liquid crystal display (LCD), a light emitting diode display (LED), etc.

Input device 112 can be any known or to be developed input device including, but not limited to, a keyboard, a touch-based input device, etc. In one example, display 110 and input device 112 can be the same when display 110 is a touch enabled device capable of receiving inputs. Network managers and operators can provide appropriate commands for monitoring and management of distributed streaming system 120, via input device 112.

Controller 102 can communicate with various components of distributed streaming system 120 via any known or to be developed wireless communications and/or wired communications mean. For example, controller 102 can access and obtain information (and/or send information) to each component of distributed system 120 via a network such as a local area wireless network (LAN), a virtual local area network (vLAN) and/or any other type of, known or to be developed, network through which controller 102 can communicate with each component of distributed streaming system 120.

In one aspect, controller 102 can be any known or to be developed electronic device including, but not limited to, a laptop, a desktop computer, a mobile device, a handheld device, etc.

Distributed streaming system 120 can be any known, or to be developed, distributed streaming system where various components thereof such as components 122-1, 122-2, 122-3 and 122-4 communicate with one another to provide a streaming service to users in a distributed fashion. Hereinafter, components 122-1, 122-2, 122-3 and 122-4 may simply be referred to as components 122 or nodes 122. While throughout the present disclosure, distributed streaming system is provided as an example, the present disclosure is not limited thereto and can encompass and be applicable to any distributed systems that can be abstracted into a Directed Acyclic Graph (DAG) where each vertex can denote an information/message, and information/messages are passed through edges in certain directions. Other examples of distributed systems include a distributed sensor network where signals are propagated from sensor to sensor, a multi-component data processing system where each component receives and processes chunks of data and pass it to the next component(s).

Each one of components 122 can be any know or to be developed electronic device capable of communicating remotely with other devices such as other components 122. For example, each component 122 can be a mobile device, a laptop, a desktop computer, a switch, a data center comprising one or more servers, etc. For example, while some of components 122 can be end user devices or hosts, other ones of components 122 can be servers that facilitate the streaming services provided by distributed streaming system 120.

Furthermore, distributed streaming system 120 can have a server 114 acting as a collector of information (data) for other components (end user devices) in the system. Examples of data include device metrics such as device ID, an associated timestamp, device IP address, device throughput, device latency, memory and processing speed characteristics, etc.

In one example, system 100 further includes one or more feedback servers 116, where various types of data (to be used by controller 102) on components 122 can be collected and saved. In another example, system 100 does not include any feedback servers and instead can directly receive (through push or pull operations) the intended data (which will be described below) from each component 122.

Distributed streaming system 120 can be a cloud based system, where each component thereof is located in a different geographical location but can communicate with one another to form distributed streaming system 120 (e.g., over the Internet).

Examples of streaming services provided via distributed streaming system 120 can include, but is not limited to, live video and/or audio content such as a speech, a concert, a TV program, music, etc.

Operations of distributed streaming system 120 for delivering a streaming service to end users can be based on any know or to be developed method for doing so, by for example, continuously processing a stream of text, graphs, videos, audios, time series data, etc. in real time or near real time or periodically. The system 100 of FIG. 1A utilizes client/server based architectures. In other examples, system 100 can be implemented as a cloud or fog computing architecture.

Figure 1B:
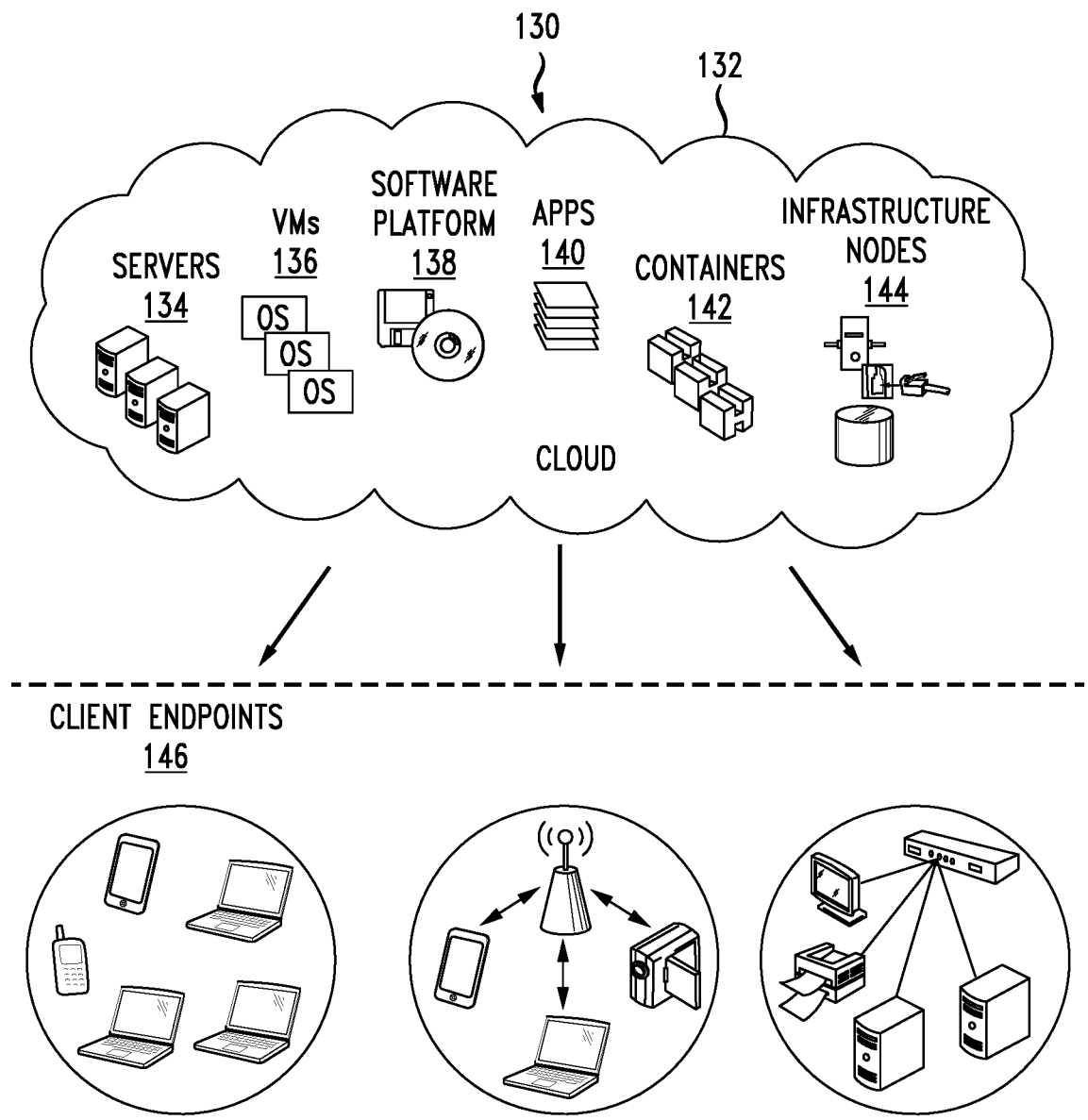

FIG. 1B illustrates a diagram of an example cloud computing architecture 130. The architecture can include a cloud 132. The cloud 132 can include one or more private clouds, public clouds, and/or hybrid clouds. Moreover, the cloud 132 can include cloud elements 134-144. The cloud elements 134-144 can include, for example, servers 134, virtual machines (VMs) 136, one or more software platforms 138, applications or services 140, software containers 142, and infrastructure nodes 144. The infrastructure nodes 144 can include various types of nodes, such as compute nodes, storage nodes, network nodes, management systems, etc. In one example, one or more servers 134 can implement the functionalities of controller 102, which will be described below. Alternatively, controller 102 can be a separate component that communicates with components of the cloud computing architecture 130 that function as a distributed streaming system similar to the distributed streamlining system 120.

The cloud 132 can provide various cloud computing services via the cloud elements 134-144, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

The client endpoints 146 can connect with the cloud 132 to obtain one or more specific services from the cloud 132. The client endpoints 146 can communicate with elements 134-144 via one or more public networks (e.g., Internet), private networks, and/or hybrid networks (e.g., virtual private network). The client endpoints 146 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1C:
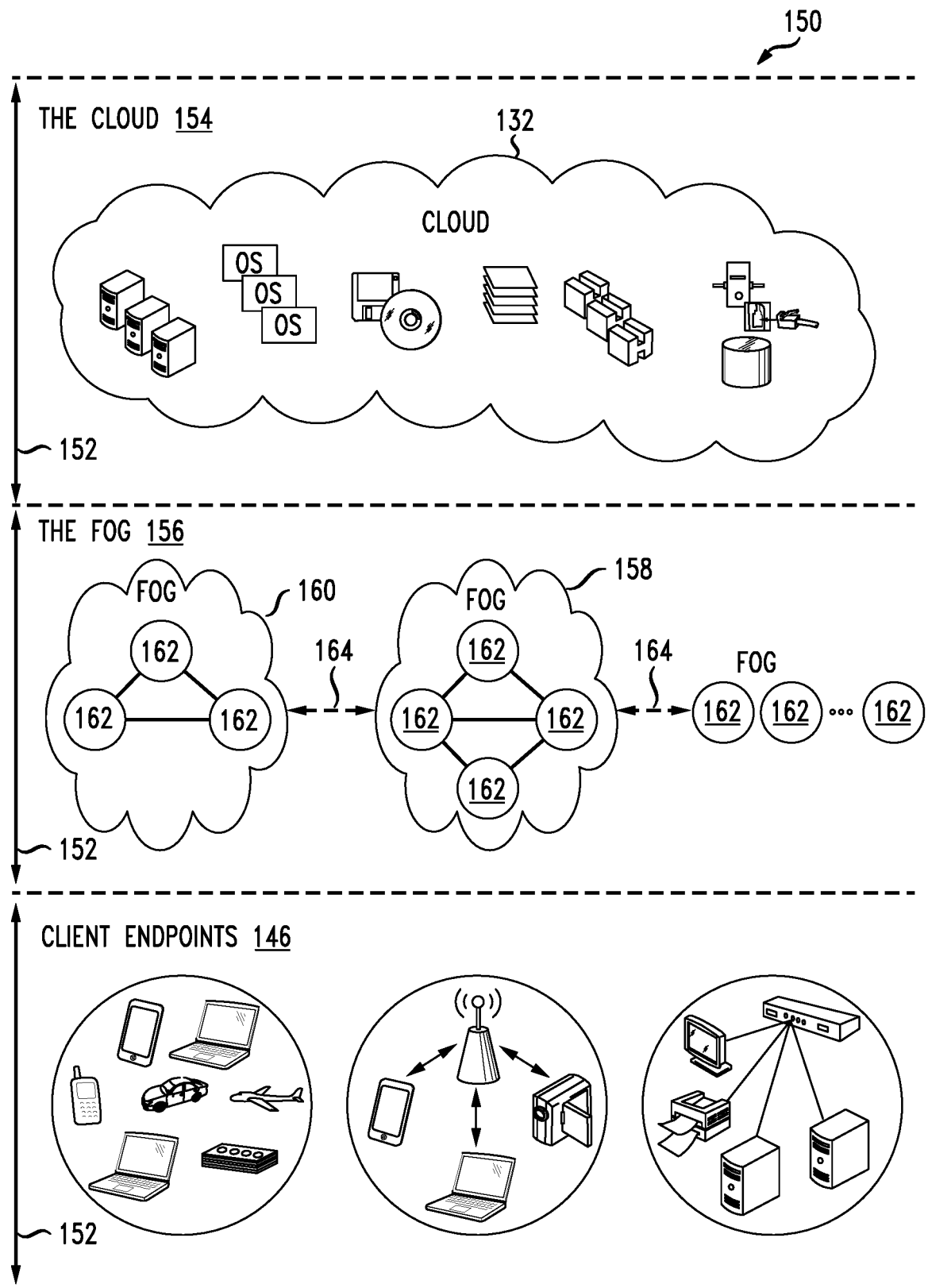

FIG. 1C illustrates a diagram of an example fog computing architecture 150. The fog computing architecture 150 can include the cloud layer 154, which includes the cloud 132 and any other cloud system or environment, and the fog layer 156, which includes fog nodes 162. The client endpoints 146 can communicate with the cloud layer 154 and/or the fog layer 156. The architecture 150 can include one or more communication links 152 between the cloud layer 154, the fog layer 156, and the client endpoints 146. Communications can flow up to the cloud layer 154 and/or down to the client endpoints 146.

In one example, one or more servers 134 can implement the functionalities of controller 102, which will be described below. Alternatively, controller 102 can be a separate component that communicates with components of the fog computing architecture 150 that function as a distributed streaming system similar to the distributed streamlining system 120

The fog layer 156 or "the fog" provides the computation, storage and networking capabilities of traditional cloud networks, but closer to the endpoints. The fog can thus extend the cloud 132 to be closer to the client endpoints 146. The fog nodes 162 can be the physical implementation of fog networks. Moreover, the fog nodes 162 can provide local or regional services and/or connectivity to the client endpoints 146. As a result, traffic and/or data can be offloaded from the cloud 132 to the fog layer 156 (e.g., via fog nodes 162). The fog layer 156 can thus provide faster services and/or connectivity to the client endpoints 146, with lower latency, as well as other advantages such as security benefits from keeping the data inside the local or regional network(s).

The fog nodes 162 can include any networked computing devices, such as servers, switches, routers, controllers, cameras, access points, kiosks, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 146. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 1D:
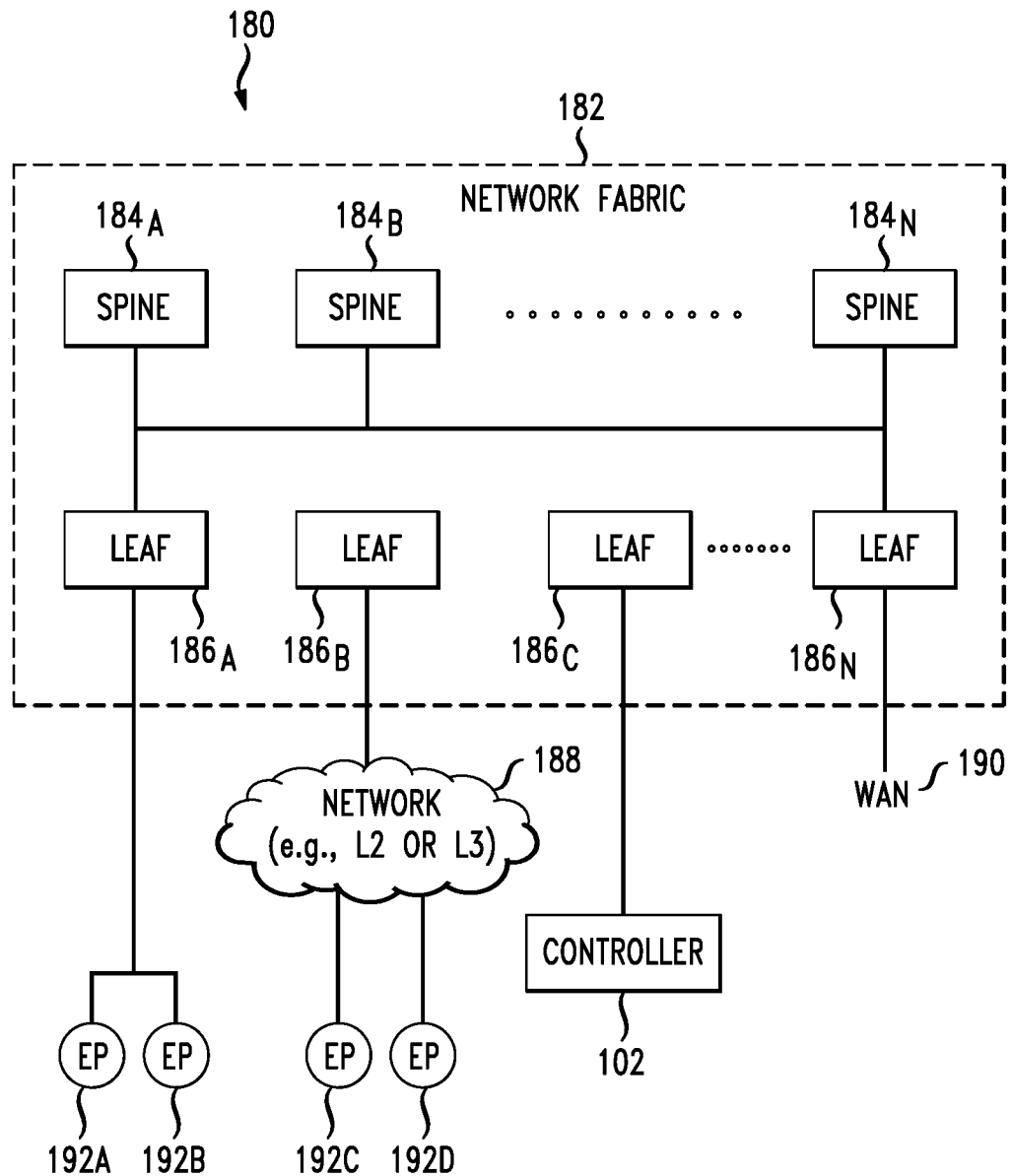

FIG. 1D illustrates a schematic block diagram of an example network architecture 180. In some cases, the architecture 180 can include a data center, which can support and/or host the cloud 132. Moreover, the architecture 180 includes a network fabric 182 with spines 184A, 184B, . . . , 184N (collectively "184") connected to leafs 186A, 186B, 186C, . . . , 186N (collectively "186") in the network fabric 182. Spines 184 and leafs 186 can be Layer 2 and/or Layer 3 devices, such as switches or routers. For the sake of clarity, they will be referenced herein as spine switches 184 and leaf switches 186.

Spine switches 184 connect to leaf switches 186 in the fabric 182. Leaf switches 186 can include access ports (or non-fabric ports) and fabric ports. Fabric ports can provide uplinks to the spine switches 182, while access ports can provide connectivity for devices, hosts, endpoints, VMs, or external networks to the fabric 182.

Leaf switches 186 can reside at the boundary between the fabric 182 and the tenant or customer space. The leaf switches 186 can route and/or bridge the tenant packets and apply network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 186 can contain virtual switching and/or tunneling functionalities, such as a virtual tunnel endpoint (VTEP) function. Thus, leaf switches 186 can connect the fabric 182 to an overlay (e.g., VXLAN network).

Network connectivity in the fabric 182 can flow through the leaf switches 186. The leaf switches 186 can provide servers, resources, endpoints, external networks, containers, or VMs access to the fabric 182, and can connect the leaf switches 186 to each other. The leaf switches 186 can connect applications and/or endpoint groups ("EPGs") to other resources inside or outside of the fabric 182 as well as any external networks.

Endpoints 192A-D (collectively "192") can connect to the fabric 182 via leaf switches 186. For example, endpoints 192A and 192B can connect directly to leaf switch 186A, which can connect endpoints 192A and 192B to the fabric 182 and/or any other of the leaf switches 186. Similarly, controller 102 (which can be the same as controller 102 described above with reference to FIG. 1A) can connect directly to leaf switch 186C, which can connect controller 102 to the fabric 182 and/or any other of the leaf switches 186. On the other hand, endpoints 192C and 192D can connect to leaf switch 186A and 186B via network 188. Moreover, the wide area network (WAN) 190 can connect to the leaf switches 186N.

Endpoints 192 can include any communication device or resource, such as a computer, a server, a cluster, a switch, a container, a VM, a virtual application, etc. In some cases, the endpoints 192 can include a server or switch configured with a virtual tunnel endpoint functionality which connects an overlay network with the fabric 182. For example, in some cases, the endpoints 192 can represent hosts (e.g., servers) with virtual tunnel endpoint capabilities, and running virtual environments (e.g., hypervisor, virtual machine(s), containers, etc.). An overlay network associated with the endpoints 192 can host physical devices, such as servers; applications; EPGs; virtual segments; virtual workloads: etc. Likewise, endpoints 192 can also host virtual workloads and applications, which can connect with the fabric 182 or any other device or network, including an external network.

Figure 2:
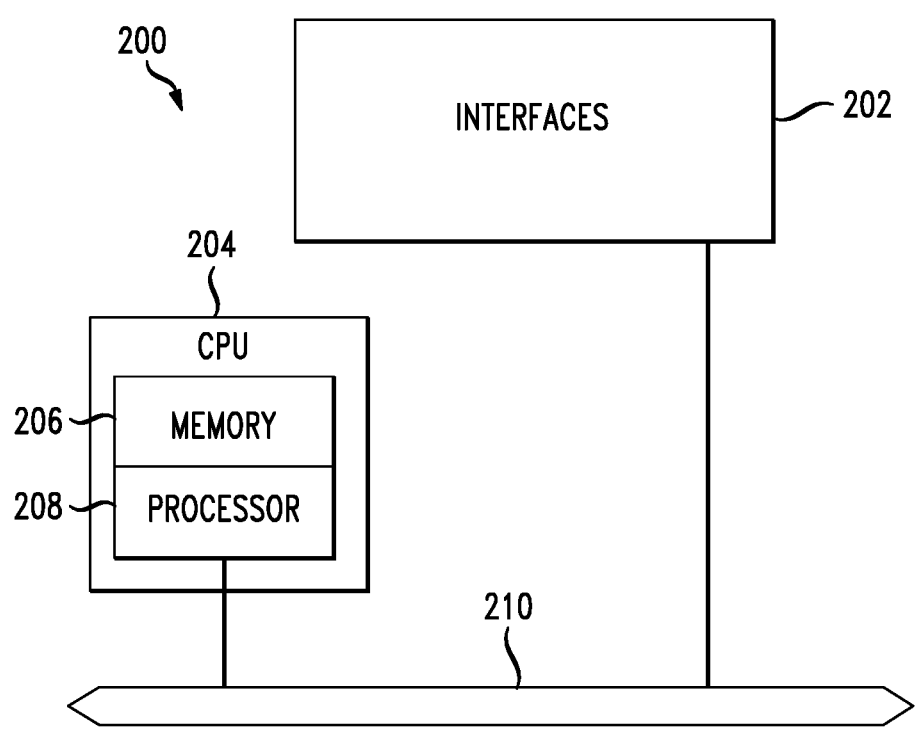
FIG. 2 illustrates an example network device suitable for performing switching, routing, load balancing, and other networking operations, according to an aspect of the present disclosure.
Figure 3:
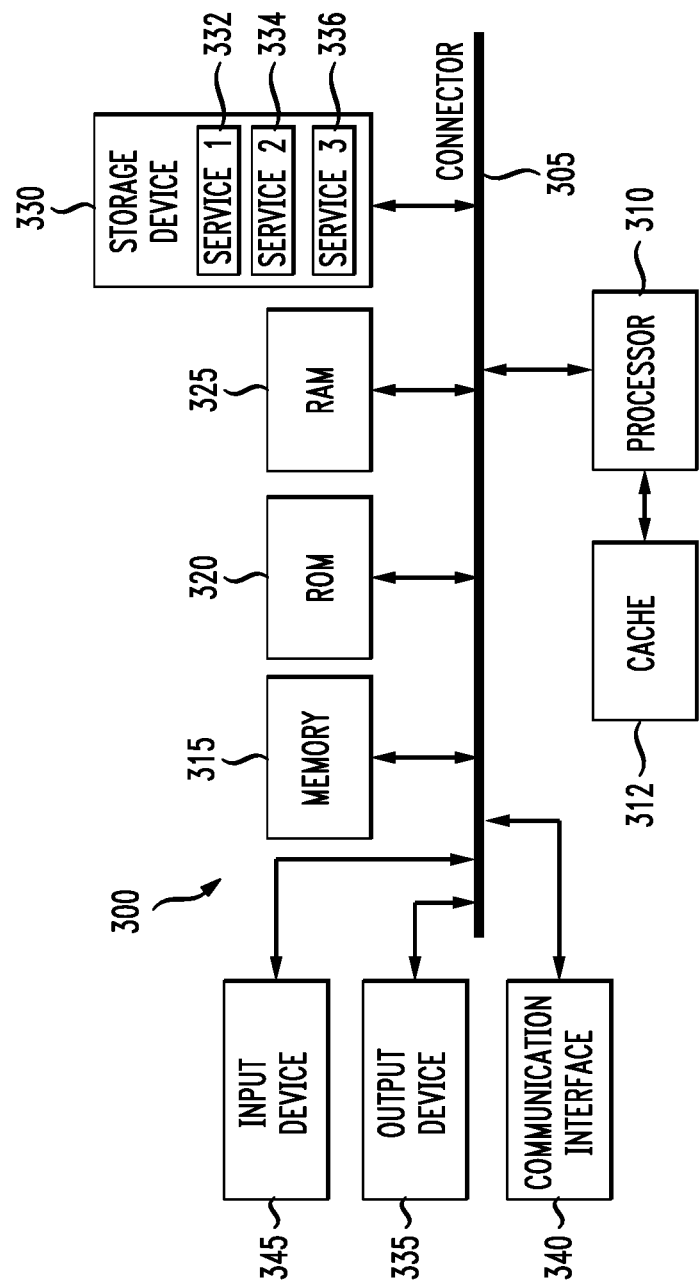
FIG. 3 illustrates a computing system architecture, according to an aspect of the present disclosure.

The disclosure now turns to FIGS. 2 and 3, which illustrate example network devices and computing devices, such as switches, routers, load balancers, client devices, and so forth.

FIG. 2 illustrates an example network device suitable for performing switching, routing, load balancing, and other networking operations, according to an aspect of the present disclosure. In one example, network device 200 can be controller 102 and/or any one of components 122 of FIG. 1A. Network device 200 includes a central processing unit ((CPU) 204, interfaces 202, and a bus 210 (e.g., a PCI bus). When acting under the control of appropriate software or firmware. CPU 204 is responsible for executing packet management, error detection, and/or routing functions. CPU 204 preferably accomplishes all these functions under the control of software including an operating system and any appropriate applications software. CPU 204 may include one or more processors 208, such as a processor from the INTEL X86 family of microprocessors. In some cases, processor 208 can be specially designed hardware for controlling the operations of network device 200. In some cases, a memory 206 (e.g., non-volatile RAM, ROM, etc.) also forms part of CPU 204. However, there are many different ways in which memory could be coupled to the system.

Interfaces 202 are typically provided as modular interface cards (sometimes referred to as "line cards"). Generally, they control the sending and receiving of data packets over the network and sometimes support other peripherals used with network device 200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces. Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 204 to efficiently perform routing computations, network diagnostics, security functions, etc.

Although the system shown in FIG. 2 is one specific network device of the present invention, it is by no means the only network device architecture on which the present invention can be implemented. For example, an architecture having a single processor that handles communications as well as routing computations, etc., is often used. Further, other types of interfaces and media could also be used with network device 200.

Regardless of the network device's configuration, it may employ one or more memories or memory modules (including memory 206) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 206 could also hold various software containers and virtualized execution environments and data.

Network device 200 can also include an application-specific integrated circuit (ASIC), which can be configured to perform routing and/or switching operations. The ASIC can communicate with other components in network device 200 via bus 210, to exchange data and signals and coordinate various types of operations by network device 200, such as routing, switching, and/or data storage operations, for example.

FIG. 3 illustrates a computing system architecture, according to an aspect of the present disclosure. As shown in FIG. 3, components of system 300 are in electrical communication with each other using a connection 305, such as a bus. Exemplary system 300 includes a processing unit (CPU or processor) 310 and a system connection 305 that couples various system components including system memory 315, such as read only memory (ROM) 320 and random access memory (RAM) 325, to processor 710. System 300 can include a cache of high-speed memory connected directly with, in close proximity to, or integrated as part of the processor 310. System 300 can copy data from memory 315 and/or storage device 330 to cache 312 for quick access by processor 310. In this way, the cache can provide a performance boost that avoids processor 310 delays while waiting for data. These and other modules can control or be configured to control the processor 310 to perform various actions. Other system memory 315 may be available for use as well. Memory 315 can include multiple different types of memory with different performance characteristics. Processor 310 can include any general purpose processor and a hardware or software service, such as Service 1 332, Service 2 334, and Service 3 336 stored in storage device 330, configured to control processor 310 as well as a special-purpose processor where software instructions are incorporated into the actual processor design. Processor 310 may be a completely self-contained computing system, containing multiple cores or processors, a bus, memory controller, cache, etc. A multi-core processor may be symmetric or asymmetric.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 325, read only memory (ROM) 320, and hybrids thereof.

The storage device 330 can include services 332, 334, 336 for controlling the processor 310. Other hardware or software modules are contemplated. The storage device 330 can be connected to the system connection 305. In one aspect, a hardware module that performs a particular function can include the software component stored in a computer-readable medium in connection with the necessary hardware components, such as the processor 310, connection 305, output device 335, and so forth, to carry out the function.

Hereinafter, a process for monitoring and managing distributed streaming system of FIGS. 1A-D will be described with reference to FIGS. 4-6.

Figure 4:
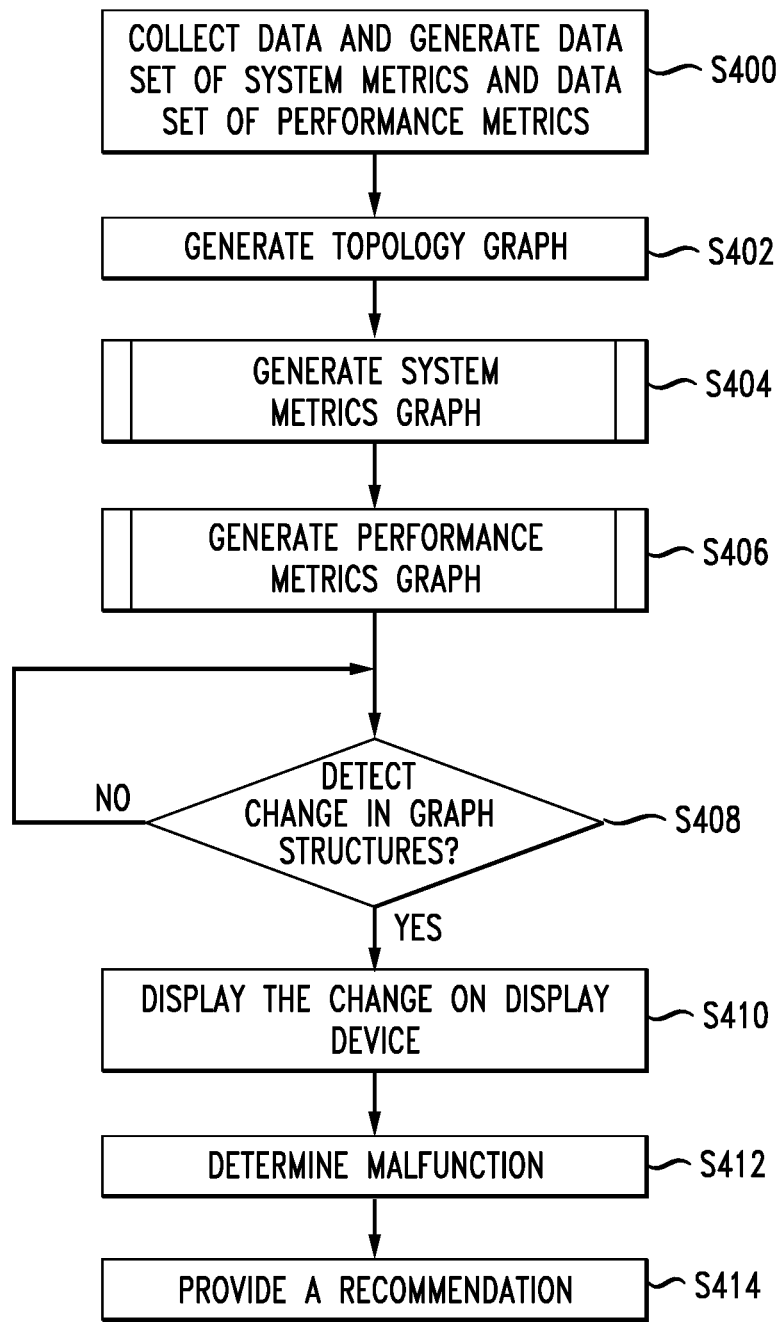
FIG. 4 illustrates a method of monitoring and managing distributed streaming systems, according to one aspect of the present disclosure.

FIG. 4 illustrates a method of monitoring and managing distributed streaming systems, according to one aspect of the present disclosure. FIG. 4 will be described from the perspective of controller 102 of FIG. 1A. However, it will be appreciated that one or more processors of controller 102 such as processor 104 execute computer-readable instructions stored on one or more memories such as memory 106 to transform the one or more processors into special purpose processor(s) for carrying out the functionalities and the process of FIG. 4.

At S400, controller 102 collects data on each component 122 of distributed streaming system 120 and generates a data set of system metrics (first metrics) and a data set of performance metrics (second metrics) for distributed streaming system 120.

Data collected by controller 102 can include system parameters collected from each component 122 and aggregated to form a data set of system metrics for distributed streaming system 120. System metrics can include information associated with components 122, such as, but not limited to, CPU utilization, memory utilization, disk utilization, packet counts, workload data size, number of services/instances running, etc. As indicated above, system metrics can be pulled by controller 102 or pushed to controller 102 via individual components 122 and/or servers 114 and 116.

In one example, system metrics can be provided to or obtained by controller 102 periodically (e.g., every few seconds, minutes, etc.). The periodicity variable can be a configurable parameter that may be set based on experiments and/or empirical studies.

Furthermore, data collected by controller 102 can include data on log events at components 122, such as I/O events, memory events, runtime events, errors (e.g., failures, memory leaks, service disruption events, connectivity problems, etc.), packets received and/or transmitted, job or workload events, service events, resource consumption, performance threshold events, status events, configuration events, upgrade events, connectivity events, communication events, service calls, log event counts, etc. In some cases, log events can be used to generate metrics such as the system metrics of the data set of system metrics described above. For example, log events and/or keywords in log events can be counted to ascertain one or more metrics. Controller 102 can compile log events into a log database. As indicated above, log events can be pulled by controller 102 or pushed to controller 102 via individual components 122 and/or servers 114 and 116.

In one example, log events can be provided to or obtained by controller 102 periodically (e.g., every few seconds, minutes, etc.). The periodicity variable can be a configurable parameter that may be set based on experiments and/or empirical studies.

Furthermore, data collected by controller 102 can include performance information of each component 102, where performance information are collected and aggregated to form a data set of performance metrics for distributed streaming system 120. Performance information can include information on latency, throughput or bandwidth, IOPS, etc.

In one example, performance metrics can be provided to or obtained by controller 102 periodically (e.g., every few seconds, minutes, etc.). As indicated above, system metrics can be pulled by controller 102 or pushed to controller 102 via individual components 122 and/or servers 114 and 116.

At S402, controller 102 generates a topology graph representing data flow in distributed streaming system 120. Distributed streaming system 120 can be modeled as a Directed Acyclic Graph (DAG) (e.g. a Topology in Apache Storm, an application in Apache Spark, a Graph in Tensorflow, etc.), where each vertex represents one component 122 in distributed streaming system 120. DAG illustrates data flow in distributed streaming system 120. Controller 102 can generate the topology graph by directly copying the DAG topology of distributed streaming system 120.

At S404, controller 102 generates a system metrics graph (first metrics graph) for distributed streaming system 120. In one example, controller 102 generates the system metrics graph based on a spectral clustering of the data set of system metrics generated at S400 and the topology graph generated at S402. The process of generating the system metrics graph will be further described with reference to FIG. 5.

At S406, controller 102 generates a performance metrics graph (second metrics graph) for distributed streaming system 120. In one example, controller 102 generates the performance metrics graph based on a spectral clustering of the data set of performance metrics generated at S400 and the topology graph generated at S402. The process of generating the performance metrics graph will be further described with reference to FIG. 6.

At S408, controller 102 determines if a change in a structure of at least one of the system metrics graph and the performance metrics graph is detected. When a component 122 (node 122) malfunctions due to various causes (e.g., a down or slow communication line that results in bottlenecking, lack of sufficient memory, etc.), structure of one or more of the system metrics graph and the performance metrics graph change. The change in the structure is a result of a change in the relationship among components 122 due to the malfunction(s).

If controller 102 determines that no change in the structure of at least one of the system metrics graph and the performance metrics graph is detected, controller 102 repeats S408 until a change occurs. In one example, controller 102 repeats S408 periodically (e.g., every few seconds, minutes, etc.) The periodicity variable can be a configurable parameter that may be set based on experiments and/or empirical studies.

At S410 and upon detecting a change at S408, controller 102 displays the change on display 110 associated with controller 102. For example, controller 102 can display the change by highlighting edges in system metrics graph and/or performance metrics graph.

At S412, controller 102 determines (identifies) a malfunction associated with detected change based on at least one generated system metrics graph and/or at least one generated performance metrics graph. The use of one or more system metrics graph and system performance graphs to identify a malfunction will be further described with respect to examples of FIGS. 7A-E. In one example, controller 102 identifies a location of the malfunction at S412 as well, where the location can be one or more specific components 122 of distributed streaming system 120 at which the malfunction has occurred.

In one example, controller 102 can have a database (e.g., stored on one or more associated memories such as memory 106) that has a table of malfunctions associated with certain frequent patterns in changes detected in system metrics graphs and/or performance metrics graphs.

Accordingly, by comparing the detected change with the database of frequency patterns stored in memory 106, controller 102 determines the malfunction corresponding to the detected change at S408.

At S414 and based on the determined malfunction, controller 102 provides a recommendation to network operator and manager (e.g., via display 110) on how to fix or address the malfunction.

In one example and in case controller 102 is unable to find a frequent pattern to match the detected change (at S408) to, then controller 102 skips S414 and simply provides a visual representation of the change on a display (e.g., display 110), which would enable an operator to locate the problem/malfunction and proceed with an attempt to address or fix the malfunction.

Figure 5:
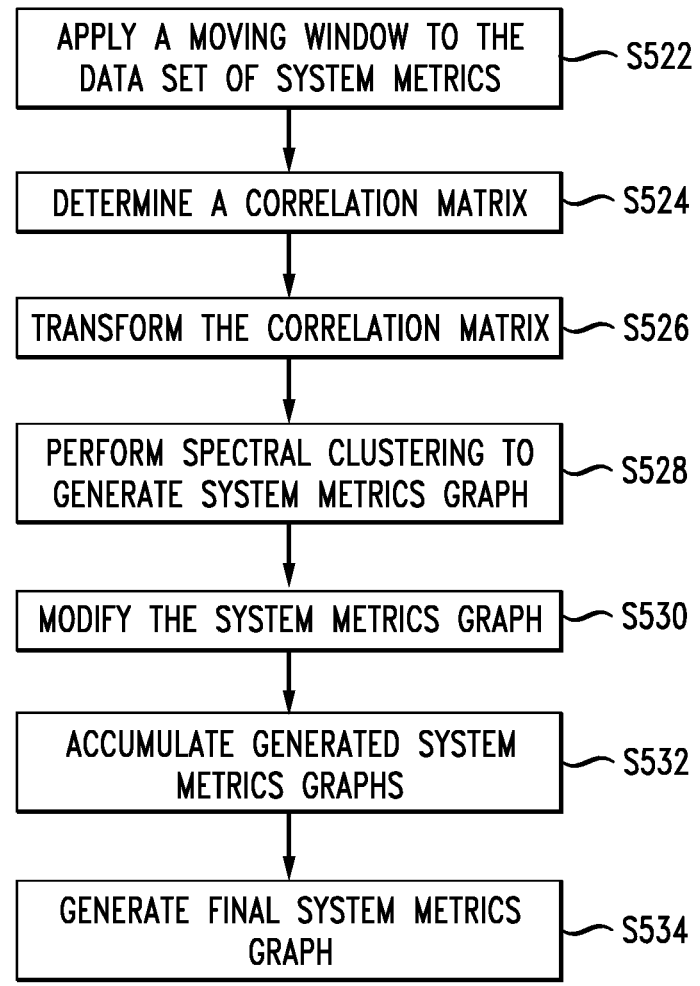
FIG. 5 illustrates a method of monitoring and managing distributed streaming systems, according to one aspect of the present disclosure.

FIG. 5 illustrates a method of monitoring and managing distributed streaming systems, according to one aspect of the present disclosure. FIG. 5 describes the generation of system metrics graph of S404 of FIG. 4. FIG. 5 will be described from the perspective of controller 102 of FIG. 1A. However, it will be appreciated that one or more processors of controller 102 such as processor 104 execute computer-readable instructions stored on one or more memories such as memory 106 to transform the one or more processors into special purpose processor(s) for carrying out the functionalities and the process of FIG. 5.

At S522, controller 102 applies a moving window to the data set of system metrics (first metrics), where the data set of system metrics generated at S400 is a multi-dimensional data set, with each dimension representing a particular type of system metrics, examples of which are described above. For each instance of the moving window applied to the data set of system metrics (each discrete instance of the moving window), controller 102 performs the following.

At S524, controller 102 determines (calculates) a correlation matrix using the multi-dimensional data set of system metrics generated at S400, where the $(i,j)^{th}$ element of the correlation matrix denotes a correlation between the $i^{th}$ and the $j^{th}$ system metrics within each instance of the moving window (fall within the same instance of the moving window).

At S526, controller 102 transforms the correlation matrix. In one example, controller 102 transforms the correlation matrix into a Laplacian matrix using any known or to be developed method.

At S528, controller 102 performs a spectral clustering, according to any known or to be developed spectral clustering methods, on the transformed matrix of S526 to generate a graph, where each vertex of the graph represents one of components 122 (nodes 122) of distributed streaming system 120 and each edge between two vertices of the graph represent a highly correlated system metric between the corresponding two components 122 associated with each edge. In one example, controller 102 assigns a weight to each edge depending on the degree of correlation between the corresponding two components 122. Each graph generated at S528 can be a window-specific system metrics graph associated with the corresponding instance of the moving window.

At S530, controller 102 modifies (trims) the window-specific system metrics graph generated at S528 based on the topology graph generated at S402 of FIG. 4. In one example and in performing the modification (trimming), controller 102 determines if there is at least one data flow between two vertices of the window-specific system metrics graph (generated at S528) according to the topology graph generated at S402. If controller 102 determines that such at least one data flow between two vertices of the window-specific system metrics graph generated at S528 exists, then controller 102 maintains the corresponding edge between two such vertices in the window-specific system metrics graph generated at S528. Otherwise, controller 102 deletes the two vertices from the window-specific system metrics graph generated at S528.

As indicated above, controller 102 performs S524 to S530 for each instance of the moving window applied at S522. Accordingly, there can be a plurality of window-specific system metrics graphs. After performing S524 to S530 for each instance of the moving window applied at S522, at S532, controller 102 accumulates the window-specific system metrics graphs generated at S530 by adding the latest window-specific system metrics graph to previously-generated window-specific system metrics graphs. This accumulation of window-specific system metrics graphs are used by controller 102 for generating a system metrics graph. In one example and after each window-specific system metric graphs generated at S530 (after generation of the latest window-specific system metrics graph), controller 102 assigns a weight (a negative or a discount rate) to previous instances of window-specific system metrics graphs generated at S530.

At S534, controller 102 generates the final system metrics graph. In one example, controller 102 generates the final system metrics graph after each instance of applying a moving window according to the process of S522 to S532 or at every predetermined number of instances of applying the moving window (e.g., after application of the moving window twice, three times, four times, etc.). The predetermined number of instances can be a configurable parameter determined based on empirical studies and/or via network operator provided input.

In one example and in generating the final system metrics graph, controller 102 determines weak edges in the final version of the accumulated system metrics graphs of S530. In one example, controller 102 determines the weak edges by comparing the value (e.g., the weight) of each edge with a threshold and each edge with a value less than the threshold is deleted (trimmed) in order to generate (produce) the final system metrics graph. In one example, the threshold is a configurable parameter that can be determined based on experiments and/or empirical studies.

Thereafter, controller 102 can repeat the process of S522 to S534 of FIG. 5.

Figure 6:
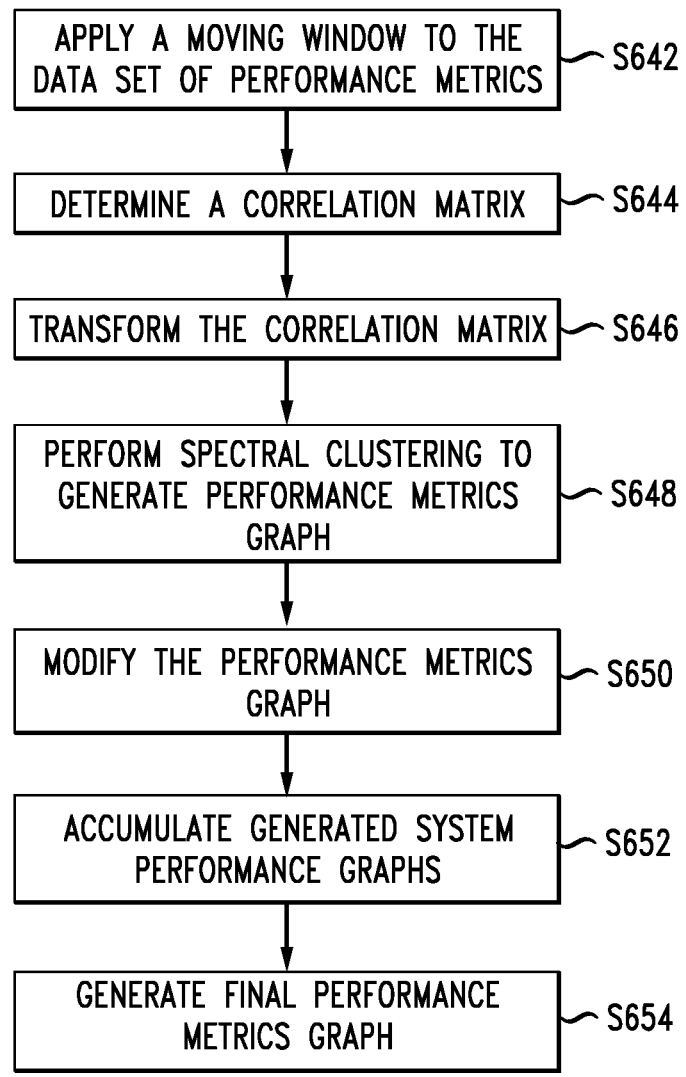
FIG. 6 illustrates a method of monitoring and managing distributed streaming systems, according to one aspect of the present disclosure.

FIG. 6 illustrates a method of monitoring and managing distributed streaming systems, according to one aspect of the present disclosure. FIG. 6 describes the generation of performance metrics graph of S406 of FIG. 4. FIG. 6 will be described from the perspective of controller 102 of FIG. 1A. However, it will be appreciated that one or more processors of controller 102 such as processor 104 execute computer-readable instructions stored on one or more memories such as memory 106 to transform the one or more processors into special purpose processor(s) for carrying out the functionalities and the process of FIG. 6.

At S642, controller 102 applies a moving window to the data set of performance metrics (second metrics), where the data set of performance metrics generated at S400 is a multi-dimensional data set, with each dimension representing a particular type of performance metrics, examples of which are described above. For each instance of the moving window applied to the data set of performance metrics (each discrete instance of the moving window), controller 102 performs the following.

At S644, controller 102 determines (calculates) a correlation matrix using the multi-dimensional data set of performance metrics generated at S400, where the $(i,j)^{th}$ element of the correlation matrix denotes a correlation between the $i^{th}$ and the $j^{th}$ performance metrics within each instance of the moving window (fall within the same instance of the moving window).

At S646, controller 102 transforms the correlation matrix. In one example, controller 102 transforms the correlation matrix into a Laplacian matrix using any known or to be developed method.

At S648, controller 102 performs a spectral clustering, according to any known or to be developed spectral clustering methods, on the transformed matrix of S526 to generate a graph, where each vertex of the graph represents one of components 122 (nodes 122) of distributed streaming system 120 and each edge between two vertices of the graph represent a highly correlated performance metric between the corresponding two components 122 associated with each edge. In one example, controller 102 assigns a weight to each edge depending on the degree of correlation between the corresponding two components 122. Each graph generated at S648 can be a window-specific performance metrics graph associated with the corresponding instance of the moving window.

At S650, controller 102 modifies (trims) the window-specific performance metrics graph generated at S528 based on the topology graph generated at S402 of FIG. 4. In one example and in performing the modification (trimming), controller 102 determines if there is at least one data flow between two vertices of the window-specific performance metrics graph (generated at S648) in the topology graph generated at S402. If controller 102 determines that such at least one data flow between two vertices of the window-specific performance metrics graph generated at S648 exists, then controller 102 maintains the corresponding edge between two such vertices in the window-specific performance metrics graph generated at S648. Otherwise, controller 102 deletes the two vertices from the window-specific performance metrics graph generated at S648.

As indicated above, controller 102 performs S644 to S650 for each instance of the moving window applied at S642. Accordingly, there can be a plurality of window-specific performance metrics graphs. After performing S644 to S650 for each instance of the moving window applied at S642, at S652, controller 102 accumulates the window-specific performance metrics graph generated at S650 by adding the latest window-specific performance metrics graph to previously generated window-specific performance metrics graphs. This accumulation of window-specific performance metrics graphs are used by controller 102 for generating a performance metrics graph. In one example and after each instance of window-specific performance metrics graph at S650 (after generation of latest window-specific performance metrics graph), controller 102 assigns a weight (a negative or a discount rate) to previous instances of window-specific performance metrics graphs generated at S650.

At S654, controller 102 generates the final performance metrics graph. In one example, controller 102 generates the final performance metrics graph after each instance of applying a moving window according to the process of S642 to S652 or at every predetermined number of instances of applying the moving window (e.g., after application of the moving window twice, three times, four times, etc.). The predetermined number of instances can be a configurable parameter determined based on empirical studies and/or via network operator provided input.

In one example and in generating the final performance metrics graph, controller 102 determines weak edges in the final version of the accumulated performance metrics graph of S650. In one example, controller 102 determines the weak edges by comparing the value (e.g., the weight) of each edge with a threshold and each edge with a value less than the threshold is deleted (trimmed) in order to generate (produce) the final performance metrics graph. In one example, the threshold is a configurable parameter that can be determined based on experiments and/or empirical studies.

Thereafter, controller 102 can repeat the process of S642 to S654 of FIG. 6.

FIGS. 7A-E illustrate example applications of the method of FIGS. 4-6, according to one aspect of the present disclosure. For purposes of FIGS. 7A-E, an assumption is made that distributed streaming system 120 has five components (nodes) 122, namely nodes A, B, C, D and E.

Figure 7A:
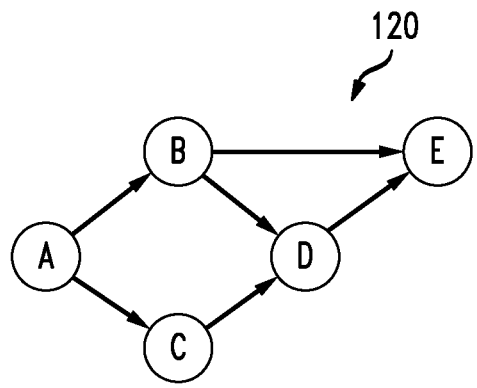
FIGS. 7A-E illustrate example applications of the method of FIGS. 4-6, according to one aspect of the present disclosure.

FIG. 7A illustrates a topology graph of an example of distributed streaming system 120 with five components (nodes) 122, namely nodes A, B, C, D and E and the dataflow therebetween.

Figure 7B:
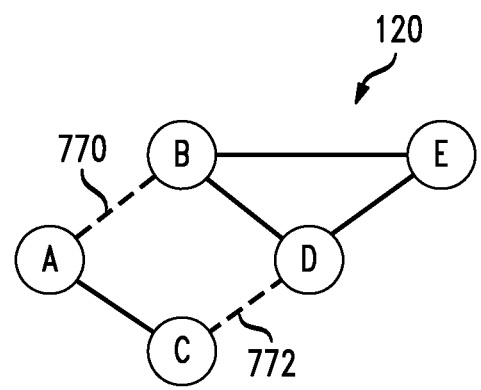

With reference to FIGS. 7B and C, a description will be given of an example performance bottleneck (performance malfunction) within distributed streaming system 120.

Under normal workload, when all nodes A-E have sufficient resources to process incoming data, the latency and throughput of each component follows a similar pattern over time. However, in one example of a performance bottleneck, the following can occur.

At a given point in time, data ingestion rate of distributed streaming system 120 can start to increase. Therefore, after a while node B can reach its resource limit and its throughput no longer increases with data ingestion. At the same time, node B's incoming messages start to queue up and the associated latency can start to increase and become uncorrelated with other nodes. Being the downstream nodes of B, as shown in FIG. 7A, the throughput of nodes D and E are also affected. Node D's and node E's throughput will be correlated with B, but will become uncorrelated with that of nodes A and C, due to the impact of B.

FIGS. 7B and C illustrate the change in the structure of performance metrics graph of distributed streaming system 120 with respect to throughput (FIG. 7B) and latency (FIG. 7C), as a result of performing the processes of FIGS. 4 and 6. As shown in FIGS. 7B and C, removed edges are highlighted using broken lines 770 and 772 in FIG. 7B and broken lines 774, 776 and 778 in FIG. 7C. The removed edges indicate that the corresponding performance metrics (throughput or latency) become uncorrelated.

FIG. 7B is an example of a visual representation of a change in the structure of performance metrics graph (with respect to the metric of network throughput) that controller 102 can provide to a network operator at S410.

Figure 7C:
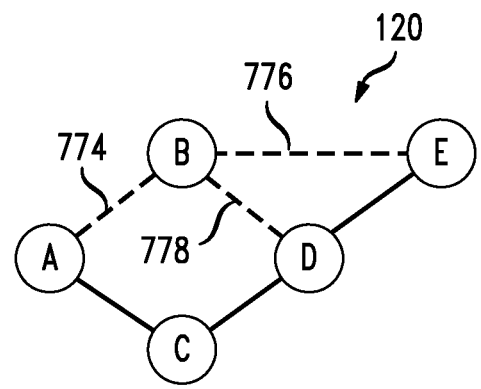

FIG. 7C is an example of a visual representation of a change in the structure of performance metrics graph (with respect to the metric of network latency) that controller 102 can provide to a network operator at S410.

Depending on whether such change is a frequent (common) change of pattern of which controller 102 has a record and a corresponding previously identified malfunction (as described above with reference to S412 and S414 of FIG. 4), either controller 102 or a network operator using controller 102 can detect a malfunction (bottleneck) at node B. Thereafter, as described with reference to FIG. 4, either controller

102 can provide a recommendation on how to fix the bottleneck at node B or the network operator can manually identify a solution and subsequently fix the bottleneck at node B.

Figure 7D:
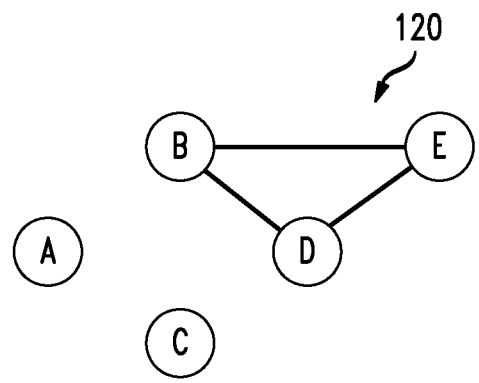
Figure 7E:
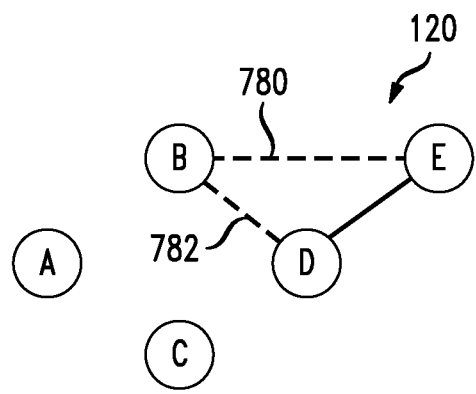

With reference to FIGS. 7D and E, a description will be given of an example system problem (system malfunction) within distributed streaming system 120.

Under normal workload, nodes B, D and E can have similar types of workload with similar memory usage patterns. An example of a system metrics graph illustrating relationship among nodes A-E with respect to the metric of memory usage is shown in FIG. 7D. However, in one example of a system malfunction, the following can occur.

At a given point in time, an error at node B can cause memory leakage at node B, resulting in node B's memory usage to become uncorrelated with that of nodes D and E, which will become problematic after passage of a certain amount of time. Accordingly, such change can be demonstrated by dashed lines 780 and 782 in FIG. 7E. As described above with reference to FIG. 4, this change can be displayed at S410.

In one example, controller 102 can provide, together with the visual representation of the change at S410, a warning message indicating that the detected memory leak at node B can impact network performance in the future. Thereafter, at some point in time and due to the performance bottleneck that is eventually detected using the performance metrics graph, as described above, controller 102 can use the results of graph 7E and the change in the performance metrics graph due to the performance bottleneck to detect (identify) the malfunction (memory leakage) at S412 and provide a recommendation to a network operator using the controller 102 for addressing (fixing) the malfunction (memory leakage in this example) at S414.

While several examples of different stages of a corrective process are described above, the present disclosure is not limited thereto. Accordingly, any gradual and multi-stage corrective process for any given configuration setting on a network device such as network devices 106-110 can be implemented at S430 and S435.

Examples described above with reference to the accompanying figures provide an improvement to one or more aspects of existing methods and systems for optimizing performance of streaming analytics systems. Streaming analytics play an important role in the technological field of modern software services, many components of which have complex dependencies and operate in real-time and in a distributed fashion. Therefore, it is important to provide application developers with a simple and easy to understand graphical representation of the state of such software systems in order for them to easily identify and discover system bottlenecks and optimize their applications accordingly. Such graphical representation is provided by examples of graph based monitoring and management systems and methods described in this application and claimed accordingly, hence providing an improvement to the performance of underlying computing devices and applications running thereon as well as to the technological field of modern software services.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
receiving, by a controller of a distributed computing system, first metrics indicating at least one of central processing unit (CPU) utilization, memory utilization, disk utilization, network throughput, or network latency for servers of the distributed computing system for a first time period and second metrics indicating at least one other of the CPU utilization, the memory utilization, the disk utilization, the network throughput, or the network latency for the servers for the first time period;

receiving, by the controller, third metrics indicating the at least one of the CPU utilization, the memory utilization, the disk utilization, the network throughput, or the network latency for the servers for a second time period and fourth metrics indicating the at least one other of the CPU utilization, the memory utilization, the disk utilization, the network throughput, or the network latency for the servers for the second time period;

determining, by at least one processor of the controller, a first graph including first vertices corresponding to the servers and first edges between pairs of the first vertices indicating data flow between pairs of corresponding servers;

determining, by the at least one processor, a second graph including second vertices corresponding to the servers and second edges between pairs of the second vertices indicating the first metrics of pairs of corresponding servers satisfy a first threshold;

determining, by the at least one processor, a third graph including third vertices corresponding to the servers and third edges between pairs of the third vertices indicating the second metrics of pairs of corresponding servers satisfy a second threshold;

determining, by the at least one processor, a fourth graph including fourth vertices corresponding to the servers and fourth edges between pairs of the fourth vertices indicating the third metrics of pairs of corresponding servers fail to satisfy the first threshold;

determining, by the at least one processor, a fifth graph including fifth vertices corresponding to the servers and fifth edges between pairs of the fifth vertices indicating the fourth metrics of pairs of corresponding servers fail to satisfy the second threshold; and presenting, by the controller, information indicating at least one of first changes between the second graph and the fourth graph or second changes between the third graph and the fifth graph.

2. The method of claim 1, wherein the information includes at least one sixth graph indicating at least one of the first changes between the second graph and the fourth graph or the second changes between the third graph and the fifth graph.

3. The method of claim 1, further comprising:
identifying a malfunction of the distributed computing system based on at least one of the first changes between the second graph and the fourth graph or the second changes between the third graph and the fifth graph.

4. The method of claim 3, further comprising:
presenting a recommendation for fixing the malfunction.

5. The method of claim 3, further comprising:
storing a pattern corresponding to at least one of the first changes between the second graph and the fourth graph or the second changes between the third graph and the fifth graph;

receiving fifth metrics indicating the at least one of the CPU utilization, the memory utilization, the disk utilization, the network throughput, or the network latency for the servers for a third time period and sixth metrics indicating the at least one other of the CPU utilization, the memory utilization, the disk utilization, the network throughput, or the network latency for the servers for the third time period;

determining a sixth graph including sixth vertices corresponding to the servers and sixth edges between pairs of the sixth vertices indicating the fifth metrics of pairs of corresponding servers fail to satisfy the first threshold;

determining, by the at least one processor, a seventh graph including seventh vertices corresponding to the servers and seventh edges between pairs of the seventh vertices indicating the sixth metrics of pairs of corresponding servers fail to satisfy the second threshold; and matching the pattern to at least one of third changes between the second graph and the sixth graph or fourth changes between the third graph and the seventh graph.

6. The method of claim 1, further comprising:
determining a correlation matrix for pairs of the servers of the distributed computing system based on at least one of the first metrics, the second metrics, the third metrics, or the fourth metrics;

determining a transformed matrix based on at least one transformation of the correlation matrix;

determining a graph based on at least one clustering of the transformed matrix; and trimming each edge in the graph not having a corresponding edge in the first graph to generate at least one of the second graph, the third graph, the fourth graph, or the fifth graph.

7. The method of claim 6, wherein the at least one transformation includes a Laplacian transformation.

8. The method of claim 6, wherein the at least one clustering includes a spectral clustering.

9. The method of claim 1, wherein the first graph is a Directed Acyclic Graph (DAG).

10. The method of claim 1, further comprising:
displaying the first graph.

11. The method of claim 1, further comprising:
displaying the second graph and the third graph.

12. The method of claim 11, further comprising:
displaying the fourth graph and the fifth graph.

13. A controller for a distributed computing system, comprising:
at least one processor;
memory including instructions that, when executed by the at least one processor, causes the controller to:
receive first metrics indicating at least one of central processing unit (CPU) utilization, memory utilization, disk utilization, network throughput, or network latency for servers of the distributed computing system for a first time period and second metrics indicating at least one other of the CPU utilization, the memory utilization, the disk utilization, the network throughput, or the network latency for the servers for the first time period;

receive third metrics indicating the at least one of the CPU utilization, the memory utilization, the disk utilization, the network throughput, or the network latency for the servers for a second time period and fourth metrics indicating the at least one other of the CPU utilization, the memory utilization, the disk utilization, the network throughput, or the network latency for the servers for the second time period;

determine a first graph including first vertices corresponding to the servers and first edges between pairs of the first vertices indicating data flow between pairs of corresponding servers;

determine a second graph including second vertices corresponding to the servers and second edges between pairs of the second vertices indicating the first metrics of pairs of corresponding servers satisfy a first threshold;

determine a third graph including third vertices corresponding to the servers and third edges between pairs of the third vertices indicating the second metrics of pairs of corresponding servers satisfy a second threshold;

determine a fourth graph including fourth vertices corresponding to the servers and fourth edges between pairs of the fourth vertices indicating the third metrics of pairs of corresponding servers fail to satisfy the first threshold;

determine a fifth graph including fifth vertices corresponding to the servers and fifth edges between pairs of the fifth vertices indicating the fourth metrics of pairs of corresponding servers fail to satisfy the second threshold; and display at least one sixth graph indicating at least one of first changes between the second graph and the fourth graph or second changes between the third graph and the fifth graph.

14. The controller of claim 13, further comprising further instructions that, when executed, further cause the controller to:

identify a malfunction of the distributed computing system based on at least one of the first changes between the second graph and the fourth graph or the second changes between the third graph and the fifth graph.

15. The controller of claim 14, further comprising further instructions that, when executed, further cause the controller to:

present a recommendation for fixing the malfunction.

16. The controller of claim 14, further comprising further instructions that, when executed, further cause the controller to:

store a pattern corresponding to at least one of the first changes between the second graph and the fourth graph or the second changes between the third graph and the fifth graph;

receive fifth metrics indicating the at least one of the CPU utilization, the memory utilization, the disk utilization, the network throughput, or the network latency for the servers for a third time period and sixth metrics indicating the at least one other of the CPU utilization, the memory utilization, the disk utilization, the network throughput, or the network latency for the servers for the third time period;

determine a seventh graph including seventh vertices corresponding to the servers and seventh edges between pairs of the seventh vertices indicating the fifth metrics of pairs of corresponding servers fail to satisfy the first threshold;

determine an eighth graph including eighth vertices corresponding to the servers and eighth edges between pairs of the eighth vertices indicating the sixth metrics of pairs of corresponding servers fail to satisfy the second threshold; and match the pattern to at least one of third changes between the second graph and the seventh graph or fourth changes between the third graph and the eighth graph.

17. A non-transitory computer-readable medium having instructions that, when executed by at least one processor of a controller of a distributed computing system, cause the controller to:

receive first metrics indicating at least one of central processing unit (CPU) utilization, memory utilization, disk utilization, network throughput, or network latency for servers of the distributed computing system for a first time period and second metrics indicating at least one other of the CPU utilization, the memory utilization, the disk utilization, the network throughput, or the network latency for the servers for the first time period;

receive third metrics indicating the at least one of the CPU utilization, the memory utilization, the disk utilization, the network throughput, or the network latency for the servers for a second time period and fourth metrics indicating the at least one other of the CPU utilization, the memory utilization, the disk utilization, the network throughput, or the network latency for the servers for the second time period;

determine a first graph including first vertices corresponding to the servers and first edges between pairs of the first vertices indicating data flow between pairs of corresponding servers;

determine a second graph including second vertices corresponding to the servers and second edges between pairs of the second vertices indicating the first metrics of pairs of corresponding servers satisfy a first threshold;

determine a third graph including third vertices corresponding to the servers and third edges between pairs of the third vertices indicating the second metrics of pairs of corresponding servers satisfy a second threshold;

determine a fourth graph including fourth vertices corresponding to the servers and fourth edges between pairs of the fourth vertices indicating the third metrics of pairs of corresponding servers fail to satisfy the first threshold;

determine a fifth graph including fifth vertices corresponding to the servers and fifth edges between pairs of the fifth vertices indicating the fourth metrics of pairs of corresponding servers fail to satisfy the second threshold; and display at least one sixth graph indicating at least one of first changes between the second graph and the fourth graph or second changes between the third graph and the fifth graph.

18. The non-transitory computer-readable medium of claim 17, further comprising further instructions that, when executed, further cause the controller to:

determine a correlation matrix for pairs of the servers of the distributed computing system based on at least one of the first metrics, the second metrics, the third metrics, or the fourth metrics;

determine a transformed matrix by performing a Laplacian transformation based on the correlation matrix;

determine a graph by performing spectral clustering based on the transformed matrix; and trimming each edge in the graph not having a corresponding edge in the first graph to generate at least one of the second graph, the third graph, the fourth graph, or the fifth graph.

19. The non-transitory computer-readable medium of claim 17, further comprising further instructions that, when executed, further cause the controller to:

display the first graph.

20. The non-transitory computer-readable medium of claim 17, further comprising further instructions that, when executed, further cause the controller to:

display the second graph and the third graph; and
display the fourth graph and the fifth graph.

\* \* \* \* \*